(No Model.) 2 Sheets—Sheet 1.

W. J. BREWER.
CAR TRUCK.

No. 384,505. Patented June 12, 1888.

ATTEST,
Chas. Amon.
Chas. Foulds.

INVENTOR,
William J. Brewer.
Per James N. Lancaster
Attorney

N. PETERS, Photo-Lithographer, Washington, D. C.

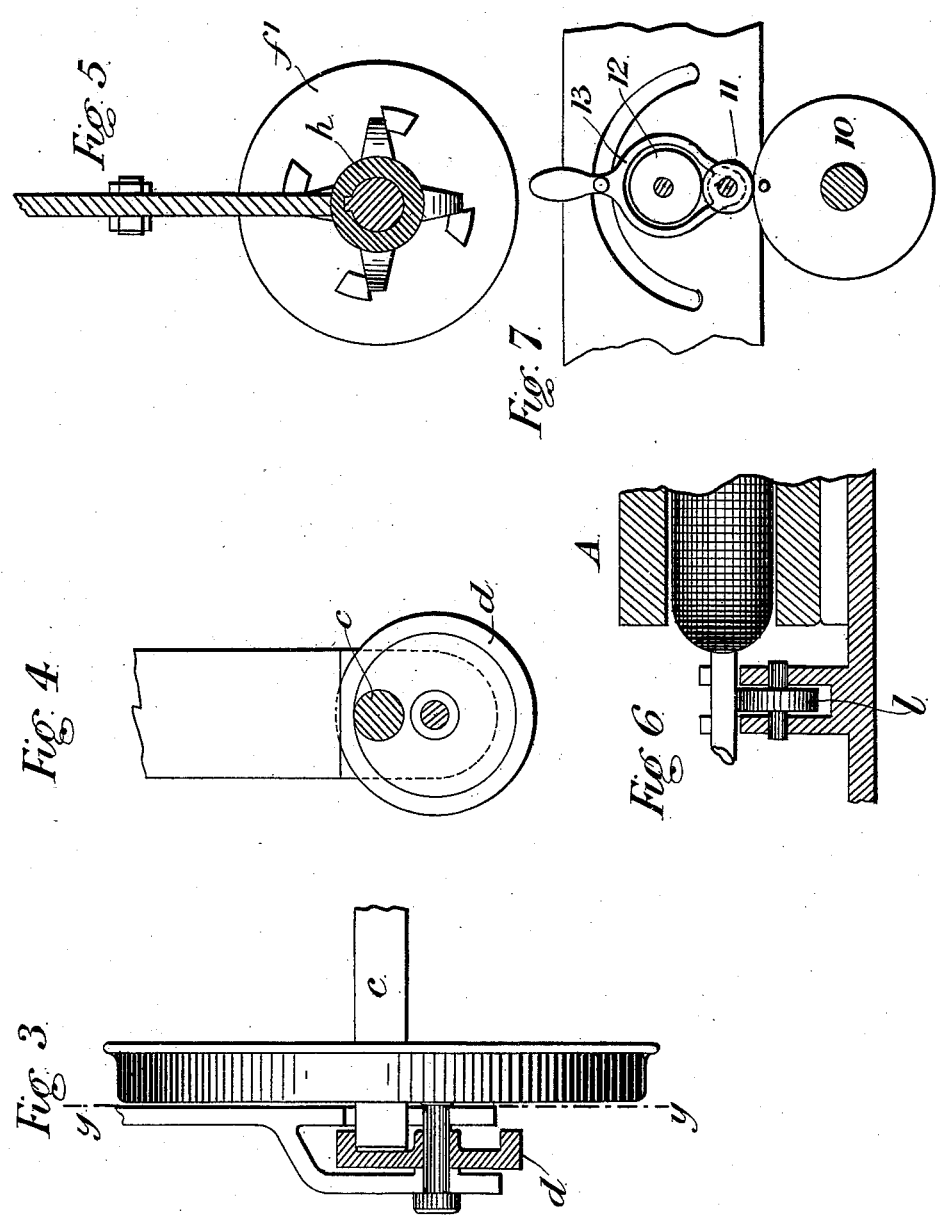

UNITED STATES PATENT OFFICE.

WILLIAM J. BREWER, OF LONDON, COUNTY OF MIDDLESEX, ENGLAND.

CAR-TRUCK.

SPECIFICATION forming part of Letters Patent No. 384,505, dated June 12, 1888.

Application filed July 26, 1887. Serial No. 245,329. (No model.)

*To all whom it may concern:*

Be it known that I, WILLIAM JOHN BREWER, a subject of the Queen of Great Britain, and a resident of London, in the county of Middlesex, England, have invented certain new and useful Improvements in Anti-Friction Bearings for Car-Trucks, of which the following is a full, clear, and exact specification.

My invention relates to bearings and starters for car-trucks, vehicles &c., of which a full and clear description will be given hereinafter.

My invention consists of anti-friction bearings composed of a series of wheels and pulleys mounted with belts leading from an electro-motive or other force; or in lieu of belts I may use gearing.

It also consists of a clutch whereby the truck or vehicle may be propelled rapidly when on level grade, or it may be operated so as to gain power when traveling on inclined grade.

Figure 1:
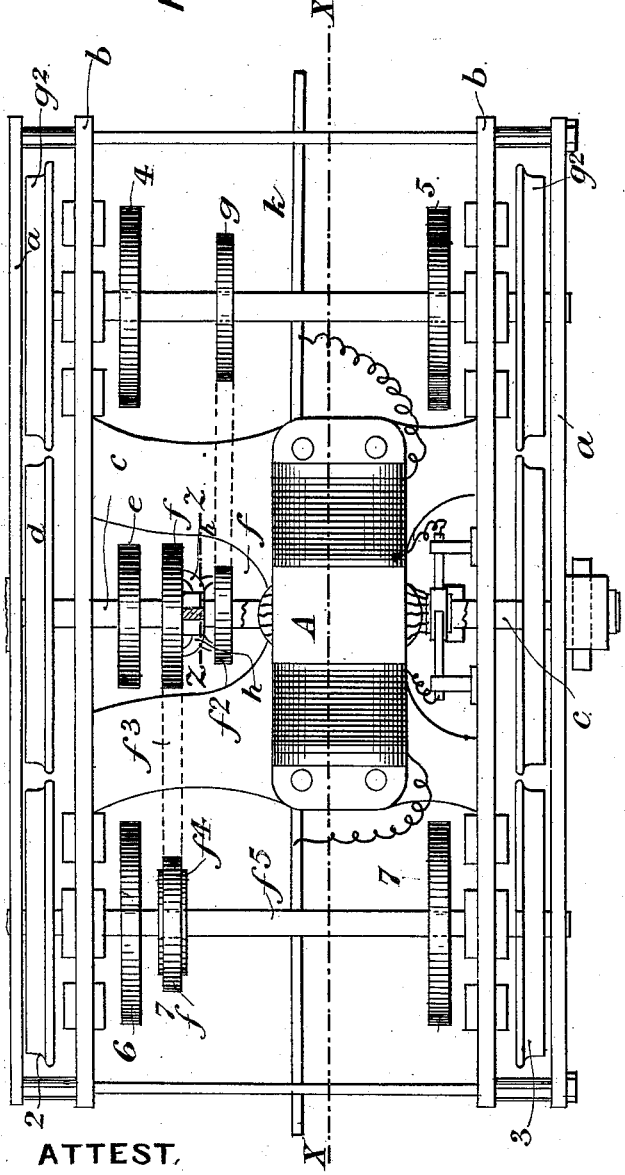
Figure 2:
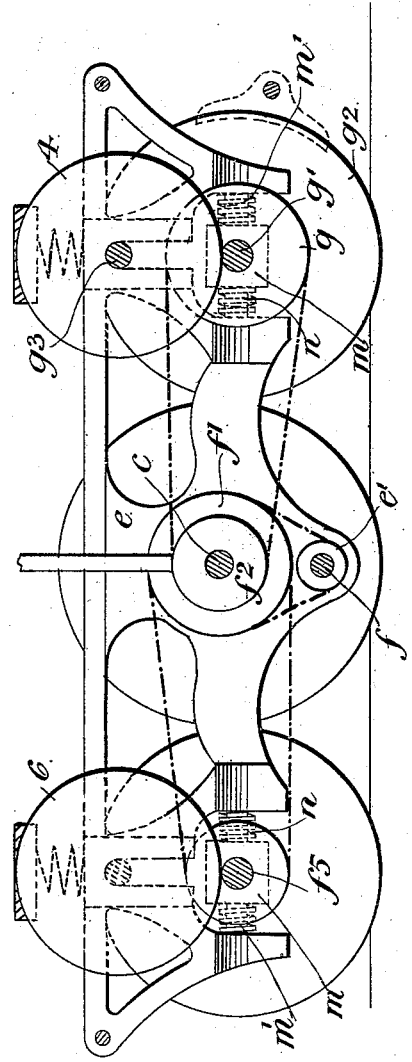

In the drawings, Figure 1 represents a plan view of a car-truck having my improvements connected therewith. Fig. 2 represents a section taken on line $xx$ of Fig. 1. In this section the electric motor is removed from its armature-shaft. Fig. 3 is a detailed section of the main driver, showing the manner in which the main frame bears upon it. Fig. 4 is a section taken on line $yy$ of Fig. 3. Fig. 5 represents a longitudinal section of an axle-box carrying two anti-friction rollers arranged on the horizontal center of the main axle. Fig. 6 represents a detailed section of the armature-shaft of the electric motor mounted on an anti-friction bearing. Fig. 7 represents a general view of a segmental lever carrying a series of anti-friction rollers which may be adjusted in line with the pull or thrust.

Similar letters refer to similar parts throughout the drawings, in which—

$a$ represents the outside frame of the truck; $b$, the inside frame.

$c$ is the axle of the main driving-wheels. Upon this axle $c$ rests the inner periphery of the anti-friction roller or wheel $d$, (see Fig. 3,) the axle of which supports the frame of the truck aforesaid.

In Fig. 5, A represents an axle-box carrying the anti-friction rollers B B, a portion of the under side of the upper portion of the box bearing upon a tangential point on the vertical center of the main axle. Said axle-box may be provided with any suitable springs to co-operate with the springs or cushions connected with the frame supporting the body of the car. Upon the said axle $c$ is mounted the wheel $e$, which is connected with the wheel or pulley $e'$ by means of a belt. Said wheel $e'$ is of course mounted on the shaft $f$, this shaft $f$ serving, of course, for the armature-shaft of an electric motor, A. There is also mounted on the said axle $c$ the large pulley $f'$ and small pulley $f^2$, the former of which is mounted with the belt $f^3$, (shown in dotted lines,) and is carried from said pulley $f'$ over and around the pulley $f^4$, mounted on the axle $f^5$, carrying the truck-wheels 2 and 3.

There is arranged on the vertical center of the pulley $f^4$ the anti-friction wheel $f^7$, which is adapted to be in frictional contact with the belt $f^3$, thus imparting a rotary motion thereto. The small pulley $f^2$ is connected by means of belt with the large pulley $g$, mounted on the axle $g'$, carrying the wheels $g^2$.

It must be observed that the axles $f^5$ and $g'$ are mounted with the anti-friction wheels 4, 5, 6, and 7, which, of course, are in constant frictional contact with the axles $f^5$ and $g'$. Between the pulleys $f'$ and $f^2$, which are mounted loosely upon the axle $c$, is arranged the double clutch $h$, keyed to said axle $c$, as shown in Fig. 5. Whenever high speed is required on level grade, the clutch $h$ is thrown in the direction of the pulley $f'$; but when going up grade the clutch is thrown in the direction of the pulley $f^2$, thus producing power instead of speed; but when traveling upon curves the clutch is thrown in the center, thus causing both pulleys to remain loose. The rail K in this instance represents the electrical conductor from which the current is taken by proper connection of the electric motor, the connection of which is unnecessary to show here, as any well-known way may be used without departing from the spirit of my invention. The armature-shaft in this instance will rest upon anti-friction wheels $l$, and the ends of said shaft may also engage with anti-friction wheels suitably supported on the sides of the frame of the truck. I may have the belts to go once around the pulleys in lieu of the manner heretofore shown. The axles $f^5$ and $g'$, carrying the small car-wheels of the truck, have a portion of their body resting within square or oblong bearing-blocks of any suitable metal $m$. On each side of these blocks $m$ is provided projecting studs $m'$, entering in suitable guides. Around these studs $m'$ is arranged one or more retracting-springs, $n$, the object of which is to assist in producing a forward movement when the brakes are released from their strain or grip.

It will be obvious that when the brakes are put on it will cause the farther spring to contract, which contraction is produced by the weight and momentum of the car, so that when the brakes are released the springs will have a tendency to propel the truck forward.

It must be observed that I provide each main axle with a clutch, whereby the wheel traveling on the outer rail of the curve may be made loose on its axle, thus decreasing the friction; but when traveling on a straight line the clutch is again operated upon, whereby it will cause the main wheel to become fixed.

In Fig. 7 is shown the adjustable device for shifting the anti-friction wheel in line with the thrust or pull. In this figure 10 represents the main wheel, and 11 the axle carrying the load or frame. 12 is the main friction-wheel, mounted in the adjustable or movable frame 13, the arm of which may be moved in the direction of the pull or thrust.

It will be observed that my present invention differs somewhat from my patent of November 21, 1882, No. 267,772, as I connect each axle carrying the truck or carriage wheels with a main driving-shaft. There is also a difference in the manner in which the belts are mounted on pulleys, so as to engage in frictional contact with other wheels, &c.

Having thus described my invention, what I claim as new, and desire to secure by Letters Patent, is—

1. The combination, with the car or vehicle truck herein shown and described, of the bearing-blocks $m$, provided with horizontal studs, the springs $n$, encircling said studs, having their guides in the frame $b$, substantially as shown and described.

2. The combination, with a car or vehicle truck, of the segmental adjustment composed of the arm 13, carrying the anti-friction wheel 12, wheel 11, and main wheel 10, substantially as shown and described.

In testimony that I claim the foregoing I have hereunto set my hand this 29th day of June, 1887.

WILLIAM J. BREWER.

Witnesses:
JAMES H. LANCASTER,
CHARLES E. FOULDS.